United States Patent
Riedel et al.

(10) Patent No.: US 11,203,441 B2
(45) Date of Patent: Dec. 21, 2021

(54) MONITORING SYSTEM FOR THE CABIN OF AN AIRCRAFT, DATA DISTRIBUTION APPARATUS AND AIRCRAFT

(71) Applicant: Airbus Operations GmbH, Hamburg (DE)

(72) Inventors: Christian Riedel, Hamburg (DE); Michael Netzler, Hamburg (DE); Gerd Bruechmann, Buchholz (DE)

(73) Assignee: Airbus Operations GmbH

( * ) Notice: Subject to any disclaimer, the term of this patent is extended or adjusted under 35 U.S.C. 154(b) by 442 days.

(21) Appl. No.: 16/375,091

(22) Filed: Apr. 4, 2019

(65) Prior Publication Data
US 2019/0308744 A1     Oct. 10, 2019

(30) Foreign Application Priority Data
Apr. 9, 2018 (DE) .................... 10 2018 205 291.3

(51) Int. Cl.
*B64D 45/00* (2006.01)
*B64D 11/00* (2006.01)
*B64D 11/04* (2006.01)

(52) U.S. Cl.
CPC .......... *B64D 45/00* (2013.01); *B64D 11/0015* (2013.01); *B64D 11/04* (2013.01); *B64D 2045/0085* (2013.01)

(58) Field of Classification Search
CPC .... B64D 45/00; B64D 11/0015; B64D 11/04; B64D 2045/0085; B64D 11/00;
(Continued)

(56) References Cited

U.S. PATENT DOCUMENTS 5,637,933 A * 6/1997 Rawlings .......... H02J 13/00016
   307/147
5,936,318 A * 8/1999 Weiler ...................... H02J 9/00
   307/66

(Continued)

FOREIGN PATENT DOCUMENTS

CA      2962615 A1 * 10/2017   ......... B64D 11/0015
DE   10 2004 049 895 A1    4/2006
(Continued)

OTHER PUBLICATIONS

French Preliminary Search Report for Application No. 1903601 dated Jun. 18, 2020, 1 page.

*Primary Examiner* — Behrang Badii
*Assistant Examiner* — Jalal C Coduroglu
(74) *Attorney, Agent, or Firm* — Lerner, David, Littenberg, Krumholz & Mentlik, LLP

(57) ABSTRACT

A monitoring system for an aircraft cabin has a main computing unit, a galley operator control apparatus and a physically separate data distribution apparatus, having a first computing unit and a second computing unit, which is autonomous in respect of the latter, and connected via an interface circuit for data interchange. The first computing unit is set up to take a cabin output signal received from the main computing unit for providing an operating signal for operating a cabin function. The second computing unit is set up to take a control command received from a galley operator control apparatus display device as a basis for providing a switching signal prompting a power control device to switch an electrical load on or off, set up to take a cabin output signal received from the first computing unit for providing a display signal to reproduce information on the display device.

17 Claims, 4 Drawing Sheets

(58) Field of Classification Search
CPC .... B64D 2221/00; B64D 41/00; G08C 19/00; H02J 3/14
See application file for complete search history.

(56) References Cited

U.S. PATENT DOCUMENTS

| | | | | |
|---|---|---|---|---|
| 6,807,148 | B1* | 10/2004 | Eicher | H04L 67/12 370/217 |
| 6,934,137 | B2* | 8/2005 | Elliott | B64D 11/0624 361/62 |
| 7,548,533 | B2* | 6/2009 | Reitmann | H04W 84/12 370/338 |
| 8,127,333 | B2* | 2/2012 | Weidel | B64D 45/0053 725/76 |
| 8,190,727 | B2* | 5/2012 | Henkel | H04L 67/12 709/223 |
| 8,447,434 | B1* | 5/2013 | Harris | H02J 3/36 700/286 |
| 9,188,380 | B2* | 11/2015 | Lu | F25D 17/02 |
| 9,238,398 | B2* | 1/2016 | Lu | B60H 1/00592 |
| 2004/0057177 | A1* | 3/2004 | Glahn | H02J 3/14 361/62 |
| 2005/0121978 | A1* | 6/2005 | McAvoy | H02J 3/14 307/43 |
| 2005/0136989 | A1* | 6/2005 | Dove | G06F 1/266 455/572 |
| 2006/0088001 | A1* | 4/2006 | Reitmann | H04B 7/18506 370/328 |
| 2006/0170542 | A1* | 8/2006 | Schoor | G08B 29/24 340/506 |
| 2007/0057576 | A1* | 3/2007 | Lee | H02J 13/0003 307/9.1 |
| 2009/0040029 | A1* | 2/2009 | Bridges | H02J 13/00007 340/12.37 |
| 2009/0043520 | A1* | 2/2009 | Pollack | B60L 53/65 702/62 |
| 2009/0113494 | A1* | 4/2009 | Weidel | B64D 45/0015 725/76 |
| 2009/0284934 | A1* | 11/2009 | Nielsen | H05K 7/1461 361/730 |
| 2010/0057899 | A1* | 3/2010 | Henkel | H04L 67/12 709/223 |
| 2010/0193629 | A1* | 8/2010 | Breit | B64D 11/04 244/58 |
| 2010/0198713 | A1* | 8/2010 | Forbes, Jr. | G06Q 30/0206 705/34 |
| 2011/0170377 | A1* | 7/2011 | Legaspi | G08B 17/00 367/199 |
| 2011/0238742 | A1* | 9/2011 | Birkmann | H04L 43/10 709/203 |
| 2013/0222347 | A1* | 8/2013 | Riedel | G06F 3/017 345/175 |
| 2014/0028189 | A1* | 1/2014 | Eckel | H05B 47/18 315/85 |
| 2014/0252880 | A1* | 9/2014 | Seigler | F24C 3/126 307/116 |
| 2014/0263835 | A1* | 9/2014 | Godecker | B64D 13/08 244/118.5 |
| 2015/0028670 | A1* | 1/2015 | Boodaghians | B64D 11/04 307/9.1 |
| 2015/0109150 | A1* | 4/2015 | Macrae | B64D 43/00 340/945 |
| 2015/0251759 | A1* | 9/2015 | Ibrahim | H02G 1/06 244/118.5 |
| 2015/0341677 | A1* | 11/2015 | Petrisor | H04N 21/6112 725/76 |
| 2016/0081008 | A1* | 3/2016 | Kuhlmann | H04B 7/18508 455/552.1 |
| 2017/0069194 | A1* | 3/2017 | Sharma | A61B 5/0816 |
| 2017/0101067 | A1* | 4/2017 | Carleial | B60R 16/03 |
| 2017/0289494 | A1* | 10/2017 | Garing | G09G 3/002 |
| 2017/0313425 | A1* | 11/2017 | Senet | B64D 11/0015 |
| 2018/0068332 | A1* | 3/2018 | Kajak | G06Q 30/0203 |

FOREIGN PATENT DOCUMENTS

| | | | |
|---|---|---|---|
| DE | 10 2007 051 196 A1 | 4/2009 | |
| DE | 10 2009 033 215 A1 | 1/2010 | |
| DE | 102009033215 A1 * | 1/2010 | ............ H04L 67/12 |
| DE | 102012203163 A1 * | 8/2013 | ........... G02B 27/017 |
| DE | 112014000030 T5 * | 1/2016 | ............ H04L 12/12 |
| DE | 20 2017 004 091 U1 | 8/2017 | |
| EP | 1 177 483 B1 | 1/2004 | |
| EP | 2213571 A2 * | 8/2010 | ............ B64D 11/04 |
| EP | 2505923 A1 * | 10/2012 | ............ F24C 7/083 |
| EP | 3037351 A1 | 6/2016 | |
| EP | 3037351 A1 * | 6/2016 | ............ H02M 7/06 |
| EP | 3141482 A1 * | 3/2017 | ........ G08B 21/0461 |
| EP | 3147000 A1 | 3/2017 | |
| EP | 3147000 A1 * | 3/2017 | ............ B64D 11/04 |
| EP | 3148186 A1 * | 3/2017 | ............... H04N 7/18 |
| EP | 3 154 151 A1 | 4/2017 | |
| EP | 3154151 A1 * | 4/2017 | ............ B60R 16/03 |
| EP | 3208194 A1 | 8/2017 | |
| EP | 3208194 A1 * | 8/2017 | ............ B64D 47/00 |
| GB | 2 525 483 A | 10/2015 | |
| GB | 2525483 A * | 10/2015 | ........ H04N 21/2146 |
| WO | WO-2009052447 A2 * | 4/2009 | ............ B60L 53/305 |
| WO | WO-2010027822 A1 * | 3/2010 | ........ B64D 11/0015 |
| WO | WO-2010132477 A2 * | 11/2010 | ............ G06Q 30/04 |
| WO | WO-2011082998 A1 * | 7/2011 | ........ B64D 11/0015 |
| WO | WO-2011119981 A1 * | 9/2011 | ............ H04L 67/12 |
| WO | WO-2013136286 A2 * | 9/2013 | ............... H02J 1/14 |
| WO | WO-2014151750 A1 * | 9/2014 | ........ B64D 11/0007 |
| WO | WO-2017173430 A1 * | 10/2017 | ........ B64D 11/0605 |

\* cited by examiner

MONITORING SYSTEM FOR THE CABIN OF AN AIRCRAFT, DATA DISTRIBUTION APPARATUS AND AIRCRAFT

FIELD OF THE INVENTION

The present invention relates to a monitoring system for the cabin of an aircraft, a data distribution apparatus, in particular for the monitoring system, and an aircraft.

BACKGROUND OF THE INVENTION

In modern aircraft, e.g. in commercial aircraft, there is usually provision inside the cabin for one or more galleys in which meals for passengers or crew members are stored and/or prepared. These galleys are for the most part provided in the form of what are known as cabin monuments, that is to say as prefabricated shelf- or cupboard-like assemblies. Besides galleys, toilets are normally also provided as cabin monuments. The assemblies for galleys have multiple compartments or shelf segments. For the most part, these compartments have containers for storing meals and beverages, trolleys or roll containers (trolley or galley cart) and functional units, such as e.g. warming ovens, refrigerators, coffee machines or the like, arranged in them. These functional units are electrical loads, the operator control and electrical (overload) protection of which usually have a switch panel provided for them on the monument.

In order to provide passengers with as much space as possible, attempts are made to integrate cabin monuments into aircraft cabins in as space-saving a manner as possible. The galleys are therefore usually arranged in the region of the aircraft entrances, and there is a need to reduce the space requirement for the galleys or generally the space requirement for cabin monuments further. In particular in passenger aircraft, the need for service functions and observation functions available in the cabin increases at the same time. By way of example, observation cameras are frequently installed in aircraft cabins, the images from which are reproduced on a monitor, so that the flight personnel can constantly keep an eye on the passengers. The aim is also to allow passengers to contact the flight personnel at any time.

In order to meet these requirements, DE 20 2017 004 091 U1 proposes a cabin monument in the form of a combined toilet/galley unit, wherein the monument has a display arranged on it that can be used to display the images recorded by an observation camera. In order to provide observation functions, service functions and further cabin functions, such as for example switching the seatbelt signs on and off, in a space-saving and efficient manner, there is normally provision for an operator control apparatus network. By way of example, DE 10 2007 051 196 A1 describes coupling observation cameras to an operator control apparatus network in the form of a bus system via a data distribution apparatus in the form of a switch, the operator control apparatus network also comprising what is known as a flight attendant panel (FAP) for the flight personnel for adjusting and controlling cabin functions, such as lighting or ventilation, and for reactions from passengers, e.g. seat-based service requests.

BRIEF SUMMARY OF THE INVENTION

Aspects of the present invention may provide a system for a cabin of an aircraft in which the space in a cabin that is available for a galley is used efficiently and the functionality in the region of the galley is improved.

According to a first aspect of the invention, there is provision for a monitoring system for a cabin of an aircraft that has a main computing unit, at least one galley operator control apparatus and a data distribution device.

The main computing unit (HRE) has a first interface, which is set up for interchanging cabin data, and a distribution interface. The cabin data can be for example control commands that a flight attendant has input via a flight attendant panel (FAP), such as e.g. the command to switch on the seatbelt signs above the seats or communication data in the case of a telephone call between multiple flight attendants. Further, cabin data can be read from a data memory and can contain for example information about the cabin layout of the respective aircraft or about individual shelf compartments of the galley being occupied by containers or functional units. As well as that, the HRE can also receive cabin data, for example a data record containing the information that a passenger sitting in a particular seat has booked a particular service, via an application server from which passengers can select services. The HRE is set up to provide cabin output signals on the distribution interface on the basis of the cabin data and to receive cabin input signals. This can be realized for example by virtue of the HRE comprising one or more processors and a data memory having an operating system. The cabin output signals are signals that contain information about the status of a cabin component or about the function to be performed in the cabin and are optionally provided for further processing. By way of example, the cabin output signals contain information concerning whether a cabin sign, such as e.g. an indicator lamp, is intended to be switched on or off, communication data or status information about the galley, e.g. about the power consumption. The cabin output signals are signals that are received from the cabin and can contain the information described above.

The at least one galley operator control apparatus has a display device, which is set up for inputting control commands and for outputting information on the basis of display signals, and a power control device (ESE). The ESE comprises a supply input designed for connection to an electric power supply of the aircraft, a multiplicity of supply outputs designed for connecting electrical loads of a galley, and a control interface. The ESE is set up to make or break an electrical connection between each individual one of the load outputs and the supply input. The display device therefore firstly forms an input device. By way of example, the display device can have a touch sensitive surface (touchscreen) that can be used to manually tap in particular commands. Further, the display device is also an output or reproduction device, however, on which information or images can be reproduced on the basis of the display signals. From a functional point of view, the ESE forms a type of switchgear cabinet for switching the individual electrical loads of the galley on and off. The information concerning between which of the individual load outputs and the supply input an electrical connection is intended to be made or broken is contained in a signal received on the control interface, which signal will be explained below. Optionally, the ESE can also be set up as an electrical overload protection that automatically breaks the electrical connection between the supply input and the respective supply output when a threshold value for a flow of current is reached at a respective supply output. The ESE can have relays, for example, in particular solid-state relays, for performing the aforementioned functions.

The data distribution apparatus is arranged physically separately from the galley operator control apparatus. By way of example, the galley operator control apparatus can be arranged directly on the cabin monument of the galley, while the data distribution device is arranged on or integrated in the outer wall of the aircraft cabin.

The data distribution apparatus comprises a first computing unit having a first control interface connected to the distribution interface of the main computing unit, a multiplicity of second control interfaces and a first coupling interface. The first computing unit is set up to take a cabin output signal received from the main computing unit as a basis for providing an operating signal for operating a cabin function on one or more of the second control interfaces and to provide received cabin output signals on the first coupling interface. The first computing unit can thus receive from the main computer, for example on the first control interface, a signal containing the command to switch on a cabin signal, e.g. a seatbelt sign. On the basis of this cabin output signal, the first computing unit generates an applicable operating signal and provides it on the applicable second control interface. Conversely, for example a signal from a smoke alarm indicating the detection of smoke can be received on one of the second control interfaces. The first computing unit generates a cabin input signal from this signal and routes said cabin input signal to the distribution interface of the HRE via the first control interface. Said HRE generates cabin data therefrom and transmits them to the FAP, for example, where the information about the smoke detection is output.

The data distribution apparatus further comprises a second computing unit, which is autonomous in respect of the first computing unit, having a first interface connected to the display device, having a second interface connected to the control interface of the power control device of the galley operator control apparatus, and having a second coupling interface connected to the first coupling interface of the first computing unit. The second computing unit is set up to take the control command received from the display device as a basis for providing a switching signal on the second interface, which switching signal prompts the power control device to make or break an electrical connection between one or more of the load outputs and the supply input, and the second computing unit is set up to provide a display signal on the first interface on the basis of a cabin output signal received on the second coupling interface.

The second computing unit forms a control device for the galley. As such, the flight personnel can use the display device to input a control command, for example a command for switching on a coffee machine of the galley. This control command is received by the second computing unit on the first interface, and said second computing unit takes this command as a basis for generating a switching signal that is applied to the control interface of the power control device via the second interface of the second computing unit. This switching signal contains the information concerning which of the supply outputs of the power control device is intended to be electrically conductively connected to the supply input of the power control device. A further function of the second computing unit consists in using the second coupling interface to interchange data with the first computing unit. In particular, the second computing unit takes the cabin output signals received thereon as a basis for generating a display signal that is provided on the first interface, so that the information contained therein is taken as a basis for generating an applicable, in particular visual, output on the display device. In this way, an interface is provided between the galley and the HRE. This allows communication between galley and main computing unit via the display device.

The second computing unit is autonomous in respect of the first computing unit, that is to say that the first and second computing units function independently of one another. In particular in the event of an operating error in the first computing unit, this does not adversely affect the operability of the second computing unit. By way of example, this can be realized by separate processors or separate processor cores that each run with separate operating systems, and by separate data memories. The first and second coupling interfaces are each designed so that just such data as are not critical to the security of the respective other computing unit can be interchanged between the computing units. This can be realized using hardware data filtering, for example. The autonomous embodiment of the second computing unit improves the dependability of the monitoring system.

A further advantage of the monitoring system according to an embodiment of the invention is that the second computing unit is integrated into the data distribution apparatus arranged physically separately from the galley operator control apparatus. In this way, space can be saved on the galley itself, for example by virtue of only the galley operator control apparatus being arranged thereon, while the data distribution device is accommodated at another point in the cabin. This advantageously also allows existing galleys to be upgraded, since the physical division of the cabin monument does not need to be altered in order to realize the control functions performed by the second computing unit. At the same time, the integration of the second computing unit together with the first computing unit into a common data distribution apparatus by providing an interface between the computing units extends the functionality available on the galley.

According to a second aspect of the invention, there is provision for an onboard network for an aircraft having the monitoring system according to the first aspect of the invention and a layout memory module. The layout memory module is designed to store information specific to the respective aircraft about the arrangement and configuration of individual components of a cabin of the aircraft as cabin data, wherein the layout memory module is connected to the main computing unit via the first interface. One of the advantages of this onboard network is that the cabin data stored in a central memory module of the aircraft are for example data about the layout of the galley, such as e.g. the type of electrical loads in the galley, the arrangement thereof within the galley or the electric power requirement thereof, and the data distribution apparatus of the monitoring system can be used to configure the electrical loads, for example. In this way, individualized adaptation of the configuration of a galley of a respective aircraft is considerably facilitated.

According to a third aspect of the invention, there is provision for a data distribution apparatus for the monitoring system. This comprises the first computing unit and the second computing unit. The first computing unit comprises a first connection device, which has the first control interface, and a second connection device, which has the second control interface. The first and second connection devices can be embodied as a plug or socket, for example, and contain electrical contact-connection devices that form the respective interfaces. The first computing unit can be formed by a first processor and a first data memory, for example. Alternatively, instead of the first processor, there can also be provision for an FPGA (Field Programmable Gate Array), that is to say an integrated circuit into which a logic circuit can be loaded. The second computing unit comprises a third connection device, which has a first interface and a second interface. The second computing unit can be formed by a second processor and a second data memory, for example. Alternatively, instead of the first processor, there can also be provision for an FPGA (Field Programmable Gate Array), that is to say an integrated circuit into which a logic circuit can be loaded. Furthermore, the data distribution apparatus comprises an interface circuit that forms the first coupling interface of the first computing unit and the second coupling interface of the second computing unit and connects them to one another, in particular connects them such that the second computing unit is autonomous in respect of the first computing unit. The coupling interfaces can be embodied as a serial interface, for example. The second interface of the second computing unit can be realized as a CAN interface or as an ARINC interface, for example. The data distribution apparatus fashioned in this manner affords the advantages cited above in relation to the first aspect of the invention.

Advantageously, the data distribution apparatus comprises a processor as the first or second processor, an FPGA and at least one data memory, wherein the processor and the FPGA are connected to one another via the interface circuit and can each access the data memory. The processor, the FPGA and the at least one data memory together form the first and second computing units.

According to a fourth aspect of the invention, there is provision for an aircraft that has a galley having multiple electrical loads and that has a monitoring system according to the first aspect of the invention. In this case, a respective electrical load of the galley is connected to a respective supply output of the power control unit. The supply input of the power control unit is connected to an electrical supply system of the aircraft, for example to a 115 volt AC voltage. The display device is arranged on the galley, for example mounted on a shelf compartment of the cabin monument. The data distribution apparatus is arranged physically separately from the galley, for example beneath an interior trim of a fuselage structure of the aircraft. Since the galley and the data distribution apparatus are physically separate, the space requirement for the galley can be decreased or at least maintained given improved functionality, resulting in a spacious cabin of the aircraft.

Advantageous configurations and developments of the invention are obtained from the description.

According to one embodiment of the monitoring system, the second interface is further designed for connection to the electrical loads and/or to functional units of the galley in order to receive status signals, representing a state of the respective load or of the respective functional unit, from each of these, and the second computing unit is set up to take a respective status signal as a basis for providing a display signal on the first interface and/or a cabin input signal on the second coupling interface. The functional units can be for example storage containers for beverages or meals or trolleys. The status signals can contain for example information about the electric power requirement of a respective load, a fill level of a respective container or similar operating information. This information can be converted by means of the second computing unit into applicable signals that are visualized on the display device or made available to the HRE via the first computing unit. This advantageously allows a wide variety of control or regulatory functions to be provided, for example power management for multiple galleys, which involves the display being used to display the present power requirement of the other galleys, so that the flight personnel can decide whether or not to switch on an additional load.

According to one embodiment of the monitoring system, the second computing unit has a camera interface set up for connection to one or more camera devices and for receiving image signals, provided by the camera device, that represent an image captured by the camera device, wherein the second computing unit is set up to take the image signals as a basis for providing image output signals on the first interface, and wherein the display device is set up to take the image output signals as a basis for reproducing an image recorded by the camera device. According to this embodiment, an interface on the second computing device is provided for an image stream from a camera device, so that the second computing device can be used to reproduce this image stream on the display device. It is thus possible for a cabin observation function to be integrated into the monitoring system in a simple manner. Since the second computing unit is designed to be autonomous in respect of the first computing unit, this additionally also increases the failsafety of a cabin observation system. The camera interface can be in the form of an Ethernet interface, for example.

The camera interface is optionally designed for supplying electric power to the camera device. This can be realized for example by virtue of the camera interface being in the form of a Power-over-Ethernet interface.

According to a further embodiment of the monitoring system, the second computing unit has a Wireless Local Area Network ("WLAN") antenna. This allows wireless communication between the second computing unit and further cabin components or further components of the monitoring system. By way of example, it allows the realization of a wireless data interchange with further galley operator control apparatuses, e.g. of data about the load requirement of the electrical loads, or with further data distribution apparatuses of the monitoring system.

Optionally, the WLAN antenna can be designed for communication on the basis of the WAIC standard. WAIC is an abbreviation for "Wireless Avionics Intra-Communications" and denotes an aviation-specific communication standard for wireless data transmission in a self-contained network of an aircraft. The technical details of this standard are known to a person skilled in the art and for example included in the ITU-R M.2197 report of the International Telecommunication Union from November 2010.

Optionally, the first interface and/or the camera interface can be formed by the WLAN antenna. This advantageously reduces the wiring complexity. Further, the display device can also be carried by the flight personnel, or remote from the galley, as a result.

Alternatively or additionally, the WLAN antenna can be set up for data interchange with a WLAN access point (WAP), which is preferably associated with a different domain of an onboard network of the aircraft than the monitoring system. In particular, the monitoring system can be associated with a higher security level of the network than the WAP. In this manner, it is advantageously possible for a data interchange to be effected between the second computing unit and for example the application server from which passengers can select services.

According to a further embodiment of the monitoring system, the second computing unit has a supplementary supply connection designed for connection to an electric power supply, so that the second computing unit is supplyable with electric power independently of the first computing unit. Optionally, in addition to a supply connection connecting both the first and the second computing unit to an electric power supply of the aircraft, for example a 28 volt DC supply, there is thus provision for a further supply connection provided specifically for the second computing unit. This increases the failsafety of the second computing unit further. This supplementary supply connection can be integrated in the aforementioned third connection device of the second computing device, for example.

According to a further embodiment of the monitoring system, the distribution interface of the main computing unit and the first control interface of the first computing unit are connected by means of a data line. This data line can be formed in particular by optical fibres, that is to say for example by fibre optic cables, or by electrical conductors, such as e.g. standard copper wires. Fibre optic cables have the advantage that they permit very high data transmission rates. The electrical conductors are by contrast cheaper.

According to one embodiment of the data distribution apparatus, the first computing unit is formed on a first printed circuit board and the second computing unit is formed on a second printed circuit board. The first and second printed circuit boards are in this case arranged in a common housing. Accordingly, there is also provision for the first, the second and the third connection device on the housing, or cutouts therefor.

Alternatively, the first printed circuit board can be arranged in a first housing and the second printed circuit board can be arranged in a separate second housing, the second housing being mounted on the first housing. Accordingly, the two computing units are accommodated in different housings, which are mounted on one another, however. In this manner, a modular design is obtained, which is advantageous in particular for upgrading an existing data distribution apparatus that already comprises a first computing unit with a second computing unit. Further, better screening of the second computing unit from the optional WLAN antenna can also be realized in this manner.

According to a further alternative, the first and second computing units can be formed on a common printed circuit board.

"Connected" or "coupled" is understood herein, in relation to components of the monitoring system or of the onboard network of an aircraft or of the interfaces of these, to mean that they are coupled to one another in a manner suitable for a data interchange. This can be realized in particular by means of wired data lines, for example a BUS system, network lines, optical fibres or the like, or by means of wireless data transmission, such as WLAN, Bluetooth, infrared or the like.

BRIEF DESCRIPTION OF THE DRAWINGS

Aspects of the invention are explained below with reference to the figures of the drawings. From the figures.

DETAILED DESCRIPTION

In the figures, the same reference signs denote components that are the same or have the same function, unless anything to the contrary is indicated.

Figure 1:
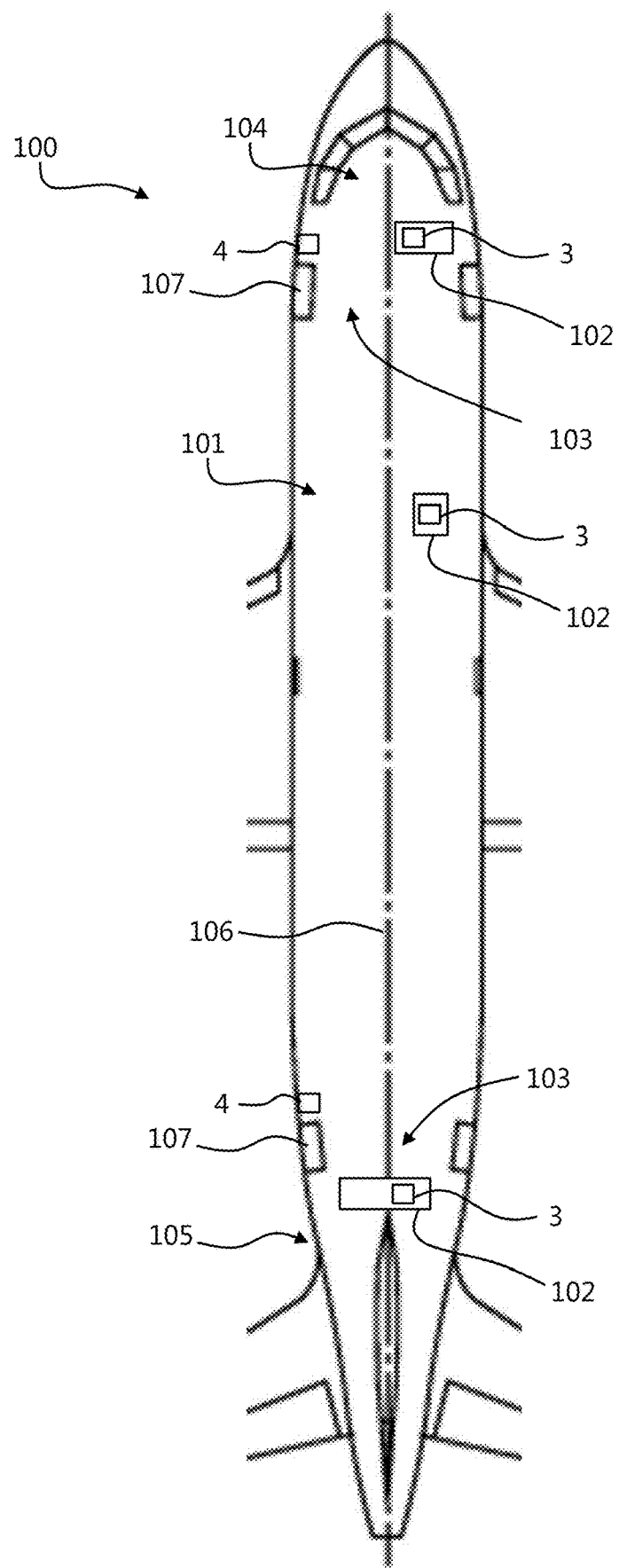
FIG. 1 shows a simplified plan view of an aircraft according to an exemplary embodiment of the present invention.

FIG. 1 shows a plan view of an aircraft 100, in particular of a cabin 101 of the aircraft 100. The aircraft 100 has multiple galleys 102 arranged in the cabin 101. In the case of the aircraft 100 shown by way of example in FIG. 1, there is provision for a total of three galleys 102, two of the galleys 102 being arranged in an entrance region 103 close to the cockpit 104 and close the rear 105 of the aircraft 100, respectively. A further galley 102 is arranged between the other galleys 102 in relation to an aircraft longitudinal axis 106.

The galleys 102 are depicted merely symbolically as blocks in FIG. 1 and are realized as cabin monuments, that is to say as prefabricated shelf- or cupboard-like assemblies. These can have in particular a multiplicity of slide-in compartments for holding containers and/or roll containers ("trolley" or "galley cart"). Further, the galleys comprise a multiplicity of electrical loads L, e.g. in the form of coffee machines, warming ovens, refrigerators, lighting or the like.

Figure 2:
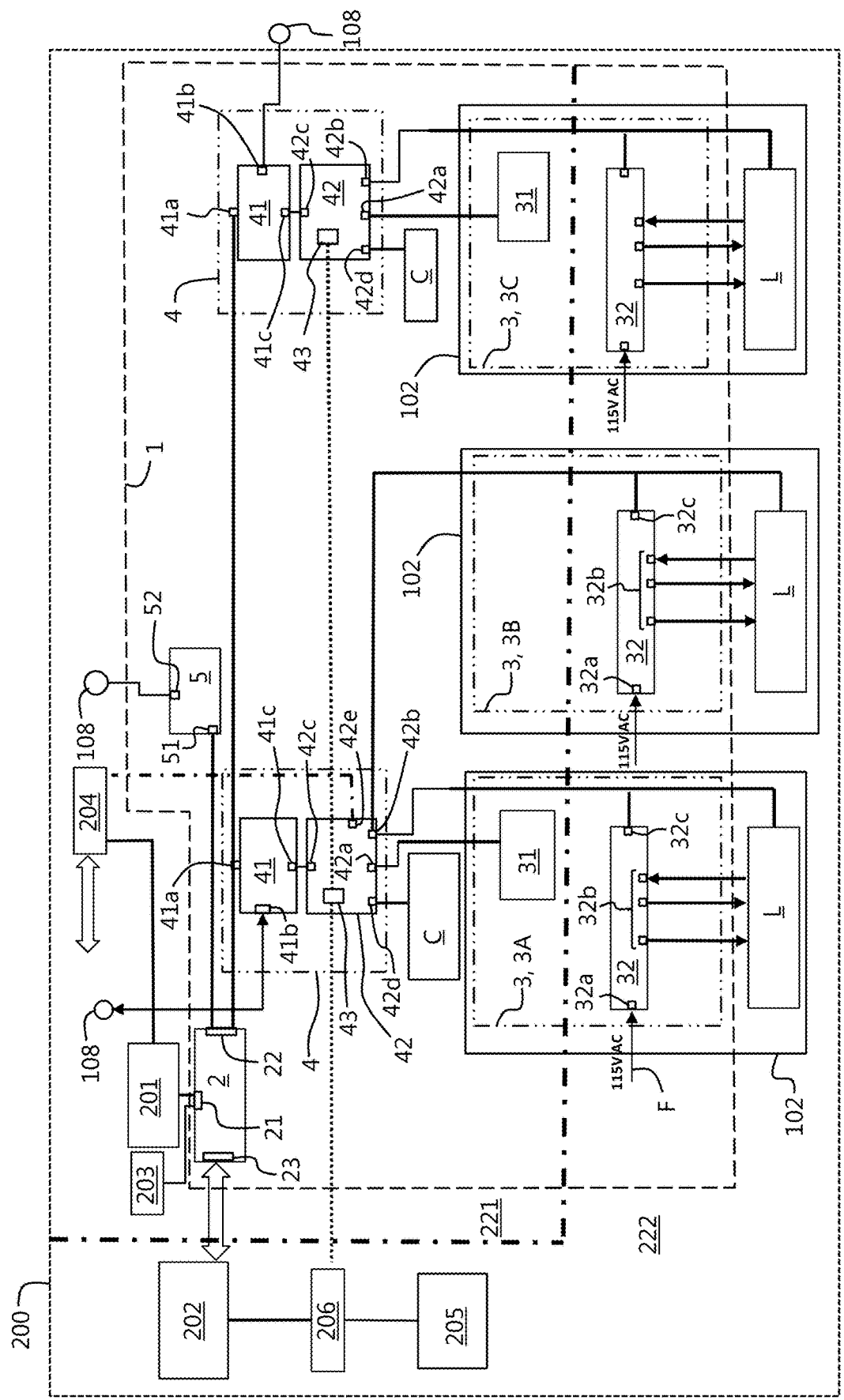
FIG. 2 shows a schematic view in the form of a block diagram of a monitoring system according to an exemplary embodiment of the present invention.

The aircraft 100 further has an onboard network 200, which is depicted in simplified manner as a block diagram in FIG. 2 by way of example. The onboard network N depicted by way of example has a monitoring system 1, an optional operator control station in the form of what is known as a flight attendant panel 201, FAP 201 for short, for the flight personnel for adjusting and controlling cabin functions, an optional application server 202 and a layout memory module 203 in the form of a non-volatile memory. As well as that, the onboard network N can have one or more switches 204 and a passenger input apparatus 205.

Using the FAP 201, the flight personnel can input control commands for operating cabin functions, such as lighting, air conditioning system or cabin signs, for example by pushing a button or throwing a switch. Possible cabin signs are for example a luminous sign indicating to a passenger that his seatbelt needs to be fastened. Further, the flight personnel can also use the FAP 201 to make cabin announcements or conduct telephone calls, e.g. with the cockpit crew. The commands input using the FAP 201 are an example of cabin data.

The application server 202 contains optional services for passengers, for example a music library or a list containing a selection of meals and beverages. A passenger can request these services for example using a passenger input apparatus 205 arranged at his seat. The passenger input apparatus 205 can be realized for example as a display device in the style of a tablet PC with a touch sensitive surface. The data records contained in the application server 202 are likewise an example of cabin data.

The layout memory module 203 is a non-volatile data memory, for example a FLASH EEPROM memory, and contains information specific to the respective aircraft 100 about the arrangement and configuration of individual components of the cabin, for example about the number and distribution of the seats (not depicted) in the cabin 101, about the arrangement and switch steps of the illuminance of the cabin lighting (not depicted) and the arrangement, shelf division and electrical loads L of the individual galleys 102.

The data contained in the layout memory module 203 are a further example of cabin data.

The monitoring system 1 has a main computing unit 2, HRE 2 for short, at least one galley operator control apparatus 3, BBV 3 for short, and a data distribution apparatus 4, DVV 4 for short.

The HRE 2 has a first interface 21, which is set up for interchanging cabin data, and a distribution interface 22. As depicted by way of example in FIG. 2, both the FAP 201 and the layout memory module 203 are connected to the HRE 2 via the first interface 21. Optionally, the layout memory module 203 can also be coupled directly to the FAP 201 and connected to the first interface 21 of the HRE merely via said FAP. The first interface 21 can be an Ethernet interface, for example. The application server 202 can be connected to the HRE 2 in particular via a separate supplementary interface 23, for example in the form of a BUS interface according to an ARINC standard such as ARINC 429, for the purpose of data interchange. The distribution interface 22 can be embodied as a CAN BUS interface, for example, and is used for data interchange between the HRE 2 and the DVV 4. It is also conceivable for the distribution interface to be embodied as an optical fibre interface set up to receive and provide optical signals.

The HRE 2 is set up to provide cabin output signals on the distribution interface 22 on the basis of the cabin data and to receive cabin input signals, in particular to process them to produce cabin data, and optionally to provide them on the first interface 21 and/or the supplementary interface 23. To this end, the HRE 2 can have a processor (not depicted), a memory (not depicted), an associated operating system and can have processing software.

The monitoring system depicted by way of example in FIG. 2 has three BBVs 3A, 3B, 3C, each of which is associated with a respective galley 103. The BBVs 3A, 3C are of the same design and each have a display device 31 and a display device 31 as an input device. There is no provision for a separate display device 31 on the BBV 3B, since the BBV 3B uses the display device of the BBV 3A.

The display device 31 is set up for inputting control commands and for outputting information on the basis of display signals. The display device 31 can be designed in particular in the style of a tablet PC and serves as an input device for the flight personnel. By way of example, the flight personnel can use a displayed by the display device 31 to select to switch a particular electrical load L of the galley on or off. Further, the display device 31 can reproduce information, e.g. about the status of an electrical load L, or images recorded using a camera device C, on the basis of received display signals.

The power control device 32, ESE 32 for short, has a supply input 32a, a multiplicity of supply outputs 32b and a control interface 32c. The supply input 32a is designed for connection to an electric power supply F of the aircraft 100, for example to a 115 volt AC mains of the aircraft 100, as depicted symbolically in FIG. 2. The number of supply outputs 32b can correspond in particular to the number of electrical loads L. The supply outputs 32b are used for connecting the electrical loads L of the galley 102. The control interface 32c is set up for receiving switching signals from the DVV, as will be explained in detail below, and can be realized as a BUS interface, for example as a CAN BUS interface or as an ARINC 812 interface.

The ESE 32 is set up to make or break an electrical connection between each individual one of the load outputs 32b and the supply input 32a. The ESE 32 therefore forms a switch device that switches the individual loads L on or off.

The ESE is optionally in the form of an electrical overload protection that automatically disconnects the respective load L in the event of a threshold value for the flow of current being reached. To this end, the ESE 32 can have a multiplicity of relays (not depicted), in particular solid-state relays.

The BBV 3 can be arranged in particular directly on the respective galley 102, as depicted symbolically in FIG. 2 by the dashed line depicting the galley 102. By way of example, the display device 31 can be mounted on the cabin monument of the galley 102, preferably detachably. The ESE 32 can likewise be integrated in the cabin monument 32 of the galley 102.

The DVV 4 is arranged physically separately from the BBV 3, in particular separately from the galley 102. By way of example, the DVV 4 can be arranged in the region at the side of a door 107, e.g. beneath an interior trim or interior cover (not depicted) lining the fuselage structure of the aircraft 100 from the cabin interior. This physical separation is extremely advantageous because in this way no additional space needs to be kept on the galley 102 and, as a result, the galley 102 can turn out more compact and/or the space available for the galley 102 can be used more efficiently.

Figure 3:
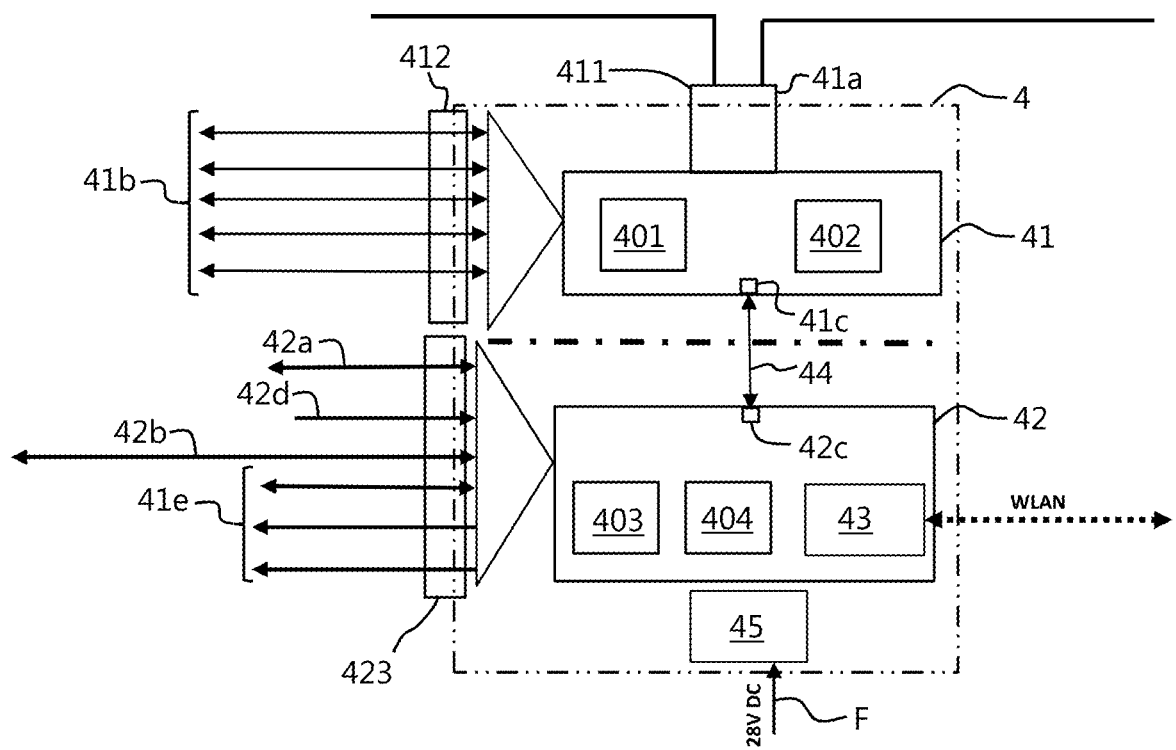
FIG. 3 shows a schematic/functional depiction of a data distribution apparatus according to an exemplary embodiment of the present invention.

FIG. 3 shows the DVV 4 by way of example and schematically. The DVV has a first computing unit 41, a second computing unit 42 and an interface circuit 44. The first computing unit 41 preferably comprises a first processor 401, a first data memory 402, a first connection device 411 and a second connection device 412. The connection devices 411, 412 can be embodied as plug sockets, for example, and have electrical contacts for conductive connection to the processor 401. The first connection device 411 contains at least one first control interface 41a. The second connection device 412 has at least one second interface 42b. In FIG. 3, the second connection device 412 shown by way of example has a total of five second interfaces 42b. The first connection device 411 can have for example Ethernet and/or CAN BUS interfaces as first control interfaces 41a. It is also conceivable for the first control interface 41a to be embodied as an optical fibre interface set up to receive and provide optical signals. The first computing unit 41 further comprises an operating system.

The second computing unit 42 preferably has a second processor 403, a second data memory 404, a third connection device 423, an optional supplementary supply connection 45 and an optional WLAN antenna 43. The third connection device 423 and the supplementary supply connection 45 can each be embodied as a plug socket and have electrical contacts for conductive connection to the processor 403. The third connection device 423 has a first interface 42a and a second interface 42b. As well as that, there can be provision for an optional camera interface 42d and optional further functional interfaces 42e. The first interface 42a is embodied for example as an Ethernet interface, preferably a Power-over-Ethernet interface. The second interface 42b is preferably a BUS interface, e.g. a CAN BUS interface or an ARINC 812 interface. The camera interface 42d can be in particular an Ethernet interface, preferably a Power-over-Ethernet interface. The further optional functional interfaces 42e can likewise comprise (Power-over-)Ethernet interfaces and/or BUS interfaces such as CAN BUS or ARINC 812 interfaces. Instead of two processors 401, 403, there can also be provision for just a single processor and additionally an FPGA.

The WLAN antenna 43 is designed in particular for communication on the basis of the WAIC standard. Optionally, the WLAN antenna 43 can also form the first interface 42a of the second computing unit 42 and/or the camera interface 42d. As well as that, it is conceivable for the WLAN antenna 43 to form an interface for data interchange with a WLAN access point 206, WAP 206 for short, of the onboard network 200.

The interface circuit 44 forms a first coupling interface 41c of the first computing unit 41 and a second coupling interface 42c of the second computing unit 42. The interface circuit 44 can be for example in the form of serial interface and connects the first and second computing units 41, 42 such that they can interchange data. In particular, the interface circuit 44 forms a data filter that merely permits the interchange of particular data so as to prevent the second computing unit 42 from having its operation adversely affected by an operating error in the first computing unit 41. The first and second computing units 41, 42 further have separate operating systems and are therefore autonomous.

The first and second computing units 41, 42 can be supplied with power for example via the first connection device 411. By way of example, the first connection device 411 can to this end contain a Power-over-Ethernet interface, not depicted. The optional supplementary supply connection 45 is in the form of a redundant supply connection for connection to an electric power supply of the aircraft, which means that the second computing unit 42 is supplyable with electric power independently of the first computing unit 41. By way of example, the second computing unit 42 can be connected to a 28 volt DC power supply of the aircraft 100 via the supplementary supply connection 45, as depicted by way of example in FIG. 3.

As depicted in FIG. 2, the first control interface 41a of the first computing unit 41 is connected to the distribution interface 22 of the HRE 2. The second interface 41b of the first computing unit 41 is connected to a cabin component 108 for operating a cabin function. The cabin component 108 can be for example a cabin luminous sign, such as e.g. a seatbelt lamp, which, as a cabin function, symbolizes to the passenger that the seatbelts need to be fastened. Further cabin components can be for example smoke sensors, switches, illuminance for the cabin lighting or indicator lamps on control panels (what are known as attendant indication panels) for the flight personnel.

As is furthermore depicted in FIG. 2 and has already been explained on the basis of FIG. 3, the first coupling interface 41c of the first computing unit 41 and the second coupling interface 42c of the second computing unit 42 are connected to one another.

In FIG. 2, it is additionally evident that the first interface 42a of the second computing unit 42 is connected to the display device 31 and the second interface 42b of the second computing unit 42 is connected to the control interface 32c of the ESE 32 of the galley operator control apparatus 3. Optionally, the second interface 42b of the second computing unit 42 can additionally be connected to one or more of the electrical loads L or other functional units of the galley 102, such as for example trolleys or the like. This allows status signals to be received, for example from a sensor fitted thereto, that represent the present power consumption of the load(s) L, the fill level of a trolley or other status information. As FIG. 2 further shows, the second computing unit 42 of the BBV 3A can additionally be connected to the ESE 32 of the further BBV 3B. This can be realized for example via one of the additional function interfaces 42e (not depicted in FIG. 2).

The first computing unit 41 is set up to take a cabin output signal received from the main computing unit 2 as a basis for providing an operating signal for operating a cabin function on one or more of the second control interfaces 41b. By way of example, the flight personnel can use the FAP 201 to input a command for switching on the seatbelt signs. This command is routed as a packet of cabin data to the HRE 2, which generates an applicable cabin output signal therefrom and provides it on the distribution interface 22. This cabin output signal is received by the first computing unit 41 on the first control interface 41a, and said first computing unit generates an applicable operating signal therefrom, which it provides on the second control interface 41b. At the cabin component 108, that is to say in this case the seatbelt sign in the form of a cabin luminous sign, switching-on is effected by the operating signal. Additionally, the first computing unit 41 is set up to provide the received cabin output signals on the first coupling interface 41c, that is to say to transmit an applicable data record to the second computing unit 42.

The second computing unit 42 is set up to provide a display signal on the first interface 42a on the basis of a cabin output signal received on the second coupling interface 42c. In the aforementioned example according to which the cabin output signal represents a command for switching on the seatbelt signs, the second computing unit 42 generates a display signal from this signal, said display signal being able to be reproduced by the display device as a graphical representation. In this manner, the information about the status of the seatbelt signs can be made available to the flight personnel on the display device. A particular advantage of the monitoring system 1 is thus that cabin information can be made available to the flight personnel on the galley 103 in a simple manner without this requiring additional installation space on the galley. By way of example, it is conceivable for the user interface reproduced by the display device 31 to be constantly synchronized to the input state of the FAP 201.

The second computing unit 42 is additionally set up to take a control command received from the display device 31 as a basis for providing a switching signal on the second interface 42b, which switching signal prompts the ESE 32 to make or break an electrical connection between one or more of the load outputs 32b and the supply input 32a. As such, the operating personnel can use an applicable input via the user interface of the display device 31 of the BBV 3A to switch the loads L of the galley 103 that are connected to the ESE 32 of the BBV 3A and the loads L of the galley 103 that are connected to the ESE 32 of the BBV 3B on or off individually or in groups.

If there are multiple galleys 103, one option is for these to have their ESEs 32 connected to a common DVV 4, as shown for the BBVs 3A and 3B in FIG. 2. Alternatively or additionally, there can also be provision for multiple DVVs 4. In FIG. 2, a further DVV 4 of the galley 103 is functionally associated with the BVV 3C, for example. Since all the DVVs 4 are coupled to the HRE 2 via the first control interface 41a of the first computing unit 41, a data interchange between the DVVs 4 can be effected in a simple manner. On the basis of the possible data interchange between the first and second computing units 41, 42, it is in particular possible for galley-specific status information, such as power consumption or meal inventory in the respective galley, to be interchanged via the HRE 2 as cabin input and cabin output signals. In this manner, a wide variety of advantageous functionalities can be provided, such as for example power management for the galleys 103, in order to optimize the utilization level of the power supply F.

As well as that, the HRE 2 advantageously forms an interface to the application server 202. The services requested by passengers can therefore be converted into cabin output signals in a simple manner, forwarded to the DVVs 4 and, there, provided on the first interface 42*a* as display signals via the second computing unit 42 on the basis of the interface circuit 43. This allows information about a service requested by a passenger to be displayed to the operating personnel on the display device 31 on the galley 103 in an extremely efficient and simple manner.

As FIG. 2 furthermore shows, optional camera interface 42*d* is connected to a camera device C recording for example an observation video of at least one region of the cabin 101. The camera device C can thus be coupled to the monitoring system 1 via the optional camera interface 42*d*. To this end, the optional camera interface 42*d* is set up for connection to one or more camera devices C and for receiving image signals provided by the camera device C that represent an image captured by the camera device C. As already explained above, the camera interface 42*d* is realized for example as a Power-over-Ethernet interface, so that the camera device C can also be supplied with power via this interface.

The second computing unit 42 is set up to take the image signals as a basis for providing image output signals on the first interface 42*a*. The image output signals are therefore a particular form of display signals. The display device 31 is accordingly set up to take the image output signals as a basis for reproducing an image recorded by the camera device C. In simplified terms, the observation video of the camera device C can be reproduced on the display device 31. In this manner, it is thus possible for an observation system to be coupled to the monitoring system 1. Since the first and second computing devices 41, 42 are autonomous in relation to one another, failsafety is improved by the observation system.

As already explained, the WLAN antenna 43 can be set up for data interchange with the WAP 206 and for data interchange with further second computing devices 42 of further DVVs 4 of the monitoring system 1. The second computing unit 42 is therefore optionally set up to provide a WLAN output signal on the WLAN antenna 43. The WLAN output signal can be for example a cabin input signal, a display signal, a switching signal or a status signal that represents a state of a load L or of a functional unit of a galley 103. As such, the WAP 206 can be used for example to transmit status information from functional units of the galley 103 from the second computing unit 42 directly to the application server 202, for example in this way the application server 202 can to be used to store whether a particular beverage or another service is still available. Further, a display signal can be transmitted to the display device 31. This saves wiring complexity and, without intrusive wiring, allows the flight personnel to remove the display device 31 from the galley 103 and to carry it with them. As well as that, signals can be interchanged between the second computing units of the various DVVs 4.

As FIG. 2 shows by way of example, the FAP 201, the layout memory module 203, the switch 204 and the components of the monitoring system 1, apart from the ESE 32, are associated with a first domain 221 of the onboard network 200. The ESE 32 of the monitoring system 1, the application server 202, the passenger input apparatus 205 and the WAP 206 are associated with a second domain 222 of the onboard network 200. In this instance, the first domain 221 has a higher security level than the second domain 222. In particular, there can be provision for the second domain 222 not to contain any kind of functions relevant to flight security and for the components of the second domain 222 to have no access to functions of the first domain 221.

As FIG. 2 furthermore shows, the monitoring system 1 can additionally have one or more supplementary data distributors 5, ZDV 5 for short. FIG. 2 depicts just one supplementary data distributor 5 connected to the HRE 2, a first interface 51 of the ZDV 5 preferably being connected to the distribution interface 22 or to an additional interface, not depicted, of the HRE. The ZDV 5 can have a similar design to the first computing unit 41 of the DVV 4, that is to say can contain a processor and a memory. Further, the ZDV 5 comprises one or more second interfaces 52, to which cabin components 108 are connected. The ZDV 5 is set up to take a cabin output signal received from the main computing unit 2 as a basis for providing an operating signal for operating a cabin function of the cabin component 108 on one or more of the second interfaces 52. Optionally, the ZDV 5 can also be set up to receive acknowledgement signals from the cabin component 108 on the second interface, e.g. in the form of signals that represent the power requirements, the operating status or similar status information of the cabin component 108, and to provide received acknowledgement signals on the first interface 51 as cabin input signals.

Optionally, the ZDV5 and the first computing device 41 of the DVV 4 can have different associated groups of cabin components 108. By way of example, the first computing device 41 of the DVV4 can have only cabin components 108 whose operation needs to be ensured during an entire flying operation of an aircraft associated with it, while the ZDV5 can have only convenience functions associated with it, such as for example reading lamps for passengers, as cabin components 108.

The optional switch 204 of the onboard network 200 is connected to the FAP 201, for example via Ethernet. Optionally, the switch 204 can alternatively or additionally also be connected to one of the functional interfaces 42*e* of the second computing device 42 of the DVV 4, for example by means of a Power-over-Ethernet connection. In this manner, it is optionally possible for additional systems or components, such as for example an additional cabin observation system, having one or more camera devices, to be incorporated into the onboard network 200 and/or coupled to the monitoring system 1.

Figure 4:
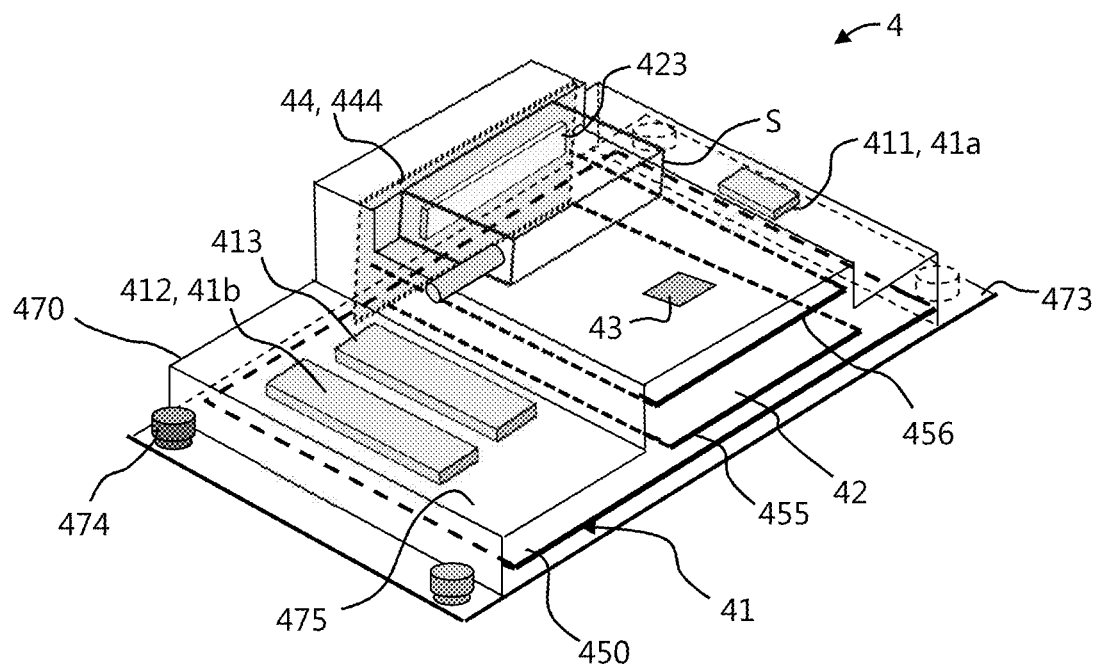
FIG. 4 shows a simplified perspective depiction of a data distribution apparatus according to an exemplary embodiment of the present invention.

FIG. 4 schematically shows an exemplary form of a DVV 4. It has a housing 470 and a baseplate 473. The baseplate 473 has multiple mounting devices 474 intended for mounting the baseplate 474 on a structural member (not depicted) of the aircraft 100. In FIG. 4, the baseplate 473 has a rectangular form and four mounting devices 474, these being provided in the corners of the baseplate.

As FIG. 4 furthermore depicts, the housing 470, that is to say an interior defined by the housing 470 and the baseplate 473, has the first computing unit 41 and the second computing unit 42 arranged in it. The first computing unit 41 is formed on a first printed circuit board 450, for example in the form of the first processor 401 (not depicted in FIG. 4) and of the first memory 402 (not depicted in FIG. 4).

The second computing unit 42 is formed on a second printed circuit board 455, for example in the form of the second processor 403 (not depicted in FIG. 4) and of the second memory 404 (not depicted in FIG. 4). The optional WLAN antenna 43 can likewise be formed on the second printed circuit board 455. Alternatively, the computing unit 42 can have a further printed circuit board 456 on which the WLAN antenna 43 is formed, as shown by way of example in FIG. 4. Further, the two computing units 41, 42 can also be formed on a single printed circuit board 450, 455. The WLAN antenna 43 can likewise be arranged on this common printed circuit board.

As FIG. 4 shows by way of example, the first and second printed circuit boards 450, 455 are arranged in a common housing 470. By way of example, the first printed circuit board 450 can be arranged immediately adjacently to the baseplate 474, while the second printed circuit board 455 and the optional further printed circuit board 456 are arranged on that side of the first printed circuit board 450 that faces away from the baseplate 474. Further, the second printed circuit board 455 and the optional further printed circuit board 456 are arranged such that they overlap only a portion of the first printed circuit board 450.

The interface circuit 44 can be formed on an interface printed circuit board 444. As is evident in FIG. 4, the interface printed circuit board 444 can extend from the baseplate 474 transversely with respect thereto. The interface printed circuit board 444 can have provision on it for multiple slots (not depicted) into which the first printed circuit board 450, the second printed circuit board 455 and the optional further printed circuit board 456 are plugged.

As FIG. 4 furthermore shows, the housing 470 has multiple recesses formed in it, into which the first connection device 411, the second connection device 412 and the third connection device 423 are inserted. Optionally, there can also be provision for a further connection device 413 of the first computing device 41, which contains one or more of the second control interfaces 41b of the first computing unit 41. In FIG. 4, the connection devices 411, 412, 413 and 423 are depicted schematically as plug sockets by way of example. The first and second connection devices 411, 412 of the first computing unit 41 are in this case provided on a cover plate 475 of the housing 470, which extends along the baseplate 473. The third connection device 423 of the second computing device 42 is provided in the region of the interface printed circuit board 444. In this manner, a connector S intended for connection to the BBV 3 can be plugged in in a space-saving manner, as depicted by way of example and schematically in FIG. 4.

Figure 5:
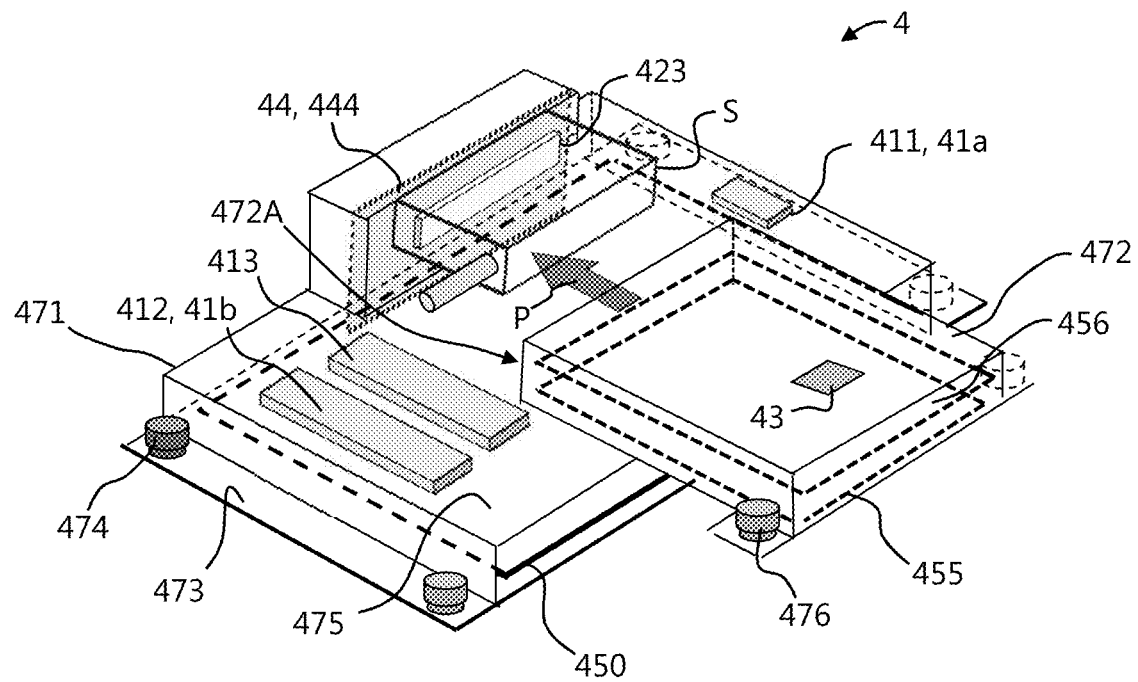
FIG. 5 shows a simplified perspective depiction of a data distribution apparatus according to a further exemplary embodiment of the present invention.

The DVV 4 shown by way of example in FIG. 5 differs from that in FIG. 4 in that the first printed circuit board 450 is arranged in a first housing 471, which is preferably closed, and the second printed circuit board 455 and the optional further printed circuit board 456 are arranged in a separate second housing 472. The first housing 471 in this case has a planar cover plate 475. The second housing 472 can be for example in the form of a flat parallelepiped and designed such that contact devices (not depicted) provided on an end face 472A can be brought into contact with the interface printed circuit board 444, for example by plugging into the latter, as indicated by the arrow P in FIG. 5.

The second housing 472 is mounted on the first housing 471, for example by means of mounting devices 476 provided on the second housing 472.

Although the present invention has been explained above by way of example on the basis of exemplary embodiments, it is not limited thereto, but rather is modifiable in a wide variety of ways. In particular, combinations of the above exemplary embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Monitoring system
2 Main computing unit
3, 3A, 3B, 3C Galley operator control apparatus
4 Data distribution apparatus
5 Supplementary data distributor
21 First interface of the main computing unit
22 Distribution interface of the main computing unit
31 Display device
32 Power control device
32a Supply input of the power control device
32b Supply outputs of the power control device
32c Control interface of the power control device
41 First computing unit of the data distributor apparatus
41a First control interface of the first computing unit
41b Second control interfaces of the first computing unit
41c First coupling interface of the first computing unit
42 Second computing unit of the data distribution apparatus
42a First interface of the second computing unit
42b Second interface of the second computing unit
42c Second coupling interface of the second computing unit
42d Camera interface of the second computing unit
42e Functional interfaces of the second computing unit
43 WLAN antenna of the second computing unit
44 Interface circuit
45 Supplementary supply connection of the second computing unit
51 First interface of the supplementary data distributor
52 Second interface of the supplementary data distributor
100 Aircraft
101 Cabin
102 Galley
103 Entrance region
104 Cockpit
105 Rear
106 Aircraft longitudinal axis
107 Door
108 Cabin components
200 Onboard network
201 Flight attendant panel
202 Application server
203 Layout memory module
204 Switch
205 Passenger input apparatus
206 WLAN access point
221 First domain of the onboard network
222 Second domain of the onboard network
401 First processor of the first computing unit
402 First data memory of the first computing unit
403 Second processor of the second computing unit
404 Second data memory of the second computing unit
411 First connection device of the first computing device
412 Second connection device of the first computing device
413 Further connection device of the first computing device
423 Third connection device of the second computing device 444 Interface printed circuit board
450 First printed circuit board
455 Second printed circuit board
456 Further printed circuit board
470 Housing
471 First housing
472 Second housing
472A End face of the second housing
473 Baseplate
474 Mounting device
475 Cover plate
476 Mounting devices
C Camera device
F Electric power supply
L Electrical loads
P Arrow
S Connector

The invention claimed is:

1. A monitoring system for a cabin of an aircraft, comprising:
a main computing unit comprising:
a first interface configured for interchanging cabin data; and
a distribution interface,
wherein the main computing unit is configured to provide cabin output signals on the distribution interface on a basis of the cabin data and to receive cabin input signals;
at least one galley operator control apparatus comprising:
a display device configured for inputting control commands and for outputting information on the basis of display signals; and
a power control device having a supply input configured for connection to an electric power supply of the aircraft, having a multiplicity of supply outputs configured for connecting electrical loads of a galley, and having a control interface,
wherein the power control device is configured to make or break an electrical connection between each individual one of the load outputs and the supply input;
a data distribution apparatus, physically separate from the galley operator control apparatus, comprising:
a first computing unit comprising:
a first control interface connected to the distribution interface of the main computing unit;
a multiplicity of second control interfaces; and
a first coupling interface,
wherein the first computing unit is configured to take a cabin output signal received from the main computing unit as a basis for providing an operating signal for operating a cabin function on one or more of the second control interfaces and to provide received cabin output signals on the first coupling interface; and
a second computing unit, autonomous in respect of the first computing unit, comprising:
a first interface connected to the display device;
a second interface connected to the control interface of the power control device of the galley operator control apparatus; and
a second coupling interface connected to the first coupling interface of the first computing unit,
wherein the second computing unit is configured to take the control command received from the display device as a basis for providing a switching signal on the second interface, the switching signal configured to prompt the power control device to make or break an electrical connection between one or more of the load outputs and the supply input, and the second computing unit is configured to provide a display signal on the first interface on a basis of a cabin output signal received on the second coupling interface.

2. The monitoring system according to claim 1, wherein the second interface is further configured for connection to the electrical loads and/or to functional units of the galley to receive status signals, representing a state of the respective load or of the respective functional unit, from each of the electrical loads or the functional units, and
wherein the second computing unit is configured to take a respective status signal as a basis for providing a display signal on the first interface and/or a cabin input signal on the second coupling interface.

3. The monitoring system according to claim 1, wherein the second computing unit comprises a camera interface configured for connection to one or more camera devices and for receiving image signals, provided by the one or more camera devices, the image signals representing an image captured by the one or more camera devices,
wherein the second computing unit is configured to take the image signals as a basis for providing image output signals on the first interface, and
wherein the display device is configured to take the image output signals as a basis for reproducing an image recorded by the one or more camera devices.

4. The monitoring system according to claim 3, wherein the camera interface is configured for supplying electric power to the one or more camera devices.

5. The monitoring system according to claim 4, wherein the camera interface is in the form of a Power-over-Ethernet interface.

6. The monitoring system according to claim 1, wherein the second computing unit comprises a Wireless Local Area Network ("WLAN") antenna.

7. The monitoring system according to claim 6, wherein the WLAN antenna is configured for communication on the basis of the Wireless Avionics Intra-Communications ("WAIC") standard.

8. The monitoring system according to claim 6, wherein the first interface and/or the camera interface is formed by the WLAN antenna.

9. The monitoring system according to claim 6, wherein the WLAN antenna is configured for data interchange with a WLAN access point of an onboard network of the aircraft.

10. The monitoring system according to claim 9, wherein the WLAN access point is associated with a different domain of the onboard network than the monitoring system.

11. The monitoring system according to claim 1, wherein the second computing unit comprises a supplementary supply connection configured for connection to an electric power supply, so that the second computing unit is supplyable with electric power independently of the first computing unit.

12. The monitoring system according to claim 1, wherein the distribution interface of the main computing unit and the first control interface of the first computing unit are connected by a data line, the data line formed by optical fibres or by electrical conductors.

13. An onboard network for an aircraft, comprising:
a monitoring system according to claim 1; and
a layout memory module configured to store information specific to a respective aircraft about an arrangement and configuration of individual components of a cabin of the aircraft as cabin data, and wherein the layout memory module is connected to the main computing unit via the first interface.

14. A data distribution apparatus for a monitoring system according to claim 1, comprising:
a first computing unit comprising a first connection device comprising a first control interface, and a second connection device comprising a second control interface;
a second computing unit comprising a third connection device comprising a first interface and a second interface, and
an interface circuit forming a first coupling interface of the first computing unit and a second coupling interface of the second computing unit and connecting the first computing unit and the second computing unit to one another.

15. The data distribution apparatus according to claim 14, wherein the first computing unit is formed on a first printed circuit board and the second computing unit is formed on a second printed circuit board, and
wherein the first and second printed circuit boards are arranged in a common housing or the first printed circuit board is arranged in a first housing and the second printed circuit board is arranged in a separate second housing, the second housing being mounted on the first housing.

16. The data distribution apparatus according to claim 14, wherein the first computing unit and the second computing unit are formed on a common printed circuit board.

17. An aircraft, comprising:
a galley having multiple electrical loads,
a monitoring system according to claim 1,
wherein a respective electrical load of the galley is connected to a respective supply output of the power control unit,
wherein the supply input of the power control unit is connected to an electrical supply system of the aircraft,
wherein the display device is arranged on the galley, and
wherein the data distribution apparatus is arranged physically separately from the galley.

* * * * *